United States Patent
Matsen et al.

(10) Patent No.: US 8,410,409 B1
(45) Date of Patent: Apr. 2, 2013

(54) FLEXIBLE COIL SEGMENTS FOR HIGH EFFICIENCY INDUCTORS

(75) Inventors: Marc R. Matsen, Seattle, WA (US); Mark A. Negley, Bellevue, WA (US); William C. Dykstra, Rockford, MI (US)

(73) Assignee: The Boeing Company, Chicago, IL (US)

( * ) Notice: Subject to any disclaimer, the term of this patent is extended or adjusted under 35 U.S.C. 154(b) by 449 days.

(21) Appl. No.: 12/644,787

(22) Filed: Dec. 22, 2009

(51) Int. Cl.
*H05B 6/10* (2006.01)

(52) U.S. Cl. .......... 219/634; 219/600; 219/618; 228/56; 228/122; 428/621; 428/675

(58) Field of Classification Search .................. 219/600, 219/634, 635, 603, 605, 633, 618, 670, 672, 219/676, 645; 228/56, 122; 428/621, 675
See application file for complete search history.

(56) References Cited

U.S. PATENT DOCUMENTS

| | | | |
|---|---|---|---|
| 5,530,227 A * | 6/1996 | Matsen et al. | ................. 219/633 |
| 5,591,369 A | 1/1997 | Matsen et al. | |
| 5,591,370 A | 1/1997 | Matsen et al. | |
| 5,599,472 A | 2/1997 | Brown et al. | |
| 5,645,744 A | 7/1997 | Matsen et al. | |
| 5,683,608 A * | 11/1997 | Matsen et al. | ................. 219/676 |
| 5,728,309 A | 3/1998 | Matsen et al. | |
| 5,770,136 A | 6/1998 | Huang | |
| 5,916,469 A | 6/1999 | Scoles et al. | |
| 6,211,497 B1 | 4/2001 | Matsen et al. | |
| 6,566,635 B1 | 5/2003 | Matsen et al. | |
| 8,017,059 B2 | 9/2011 | Matsen et al. | |
| 2009/0071217 A1 | 3/2009 | Matsen et al. | |
| 2009/0074905 A1 | 3/2009 | Matsen et al. | |

OTHER PUBLICATIONS

USPTO Notice of Allowance dated May 30, 2012 regarding U.S. Appl. No. 12/610,916, 7 pages.
Matsen et al.; "Tooling Inserts for Laminated Tooling," USTPO U.S. Appl. No. 12/610,916, filed Nov. 2, 2009, 53 pages.

* cited by examiner

*Primary Examiner* — David Nhu
(74) *Attorney, Agent, or Firm* — Yee & Associates, P.C.

(57) ABSTRACT

An apparatus may have a tool die for forming a component. The tool die may have a die susceptor having a forming surface for forming the component, and at least one flexible induction coil segment for heating the die susceptor. The at least one flexible induction coil segment may be configured to conform to a contour of the forming surface of the die susceptor.

26 Claims, 11 Drawing Sheets

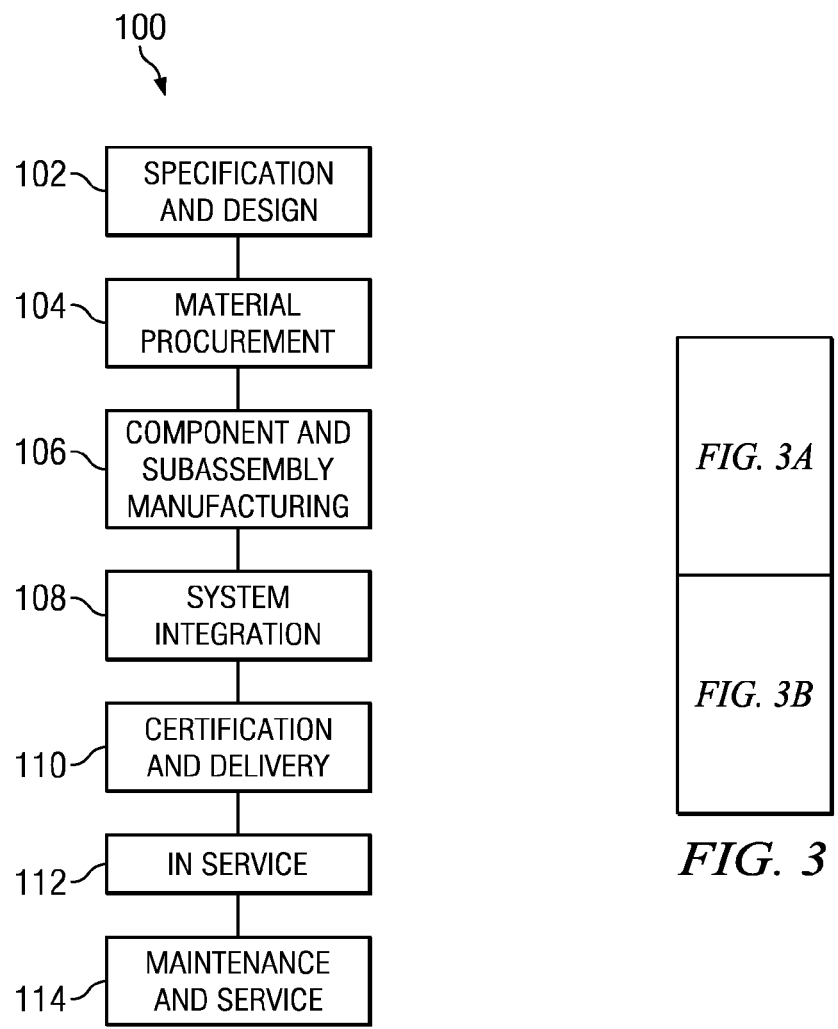
FIG. 1
FIG. 3
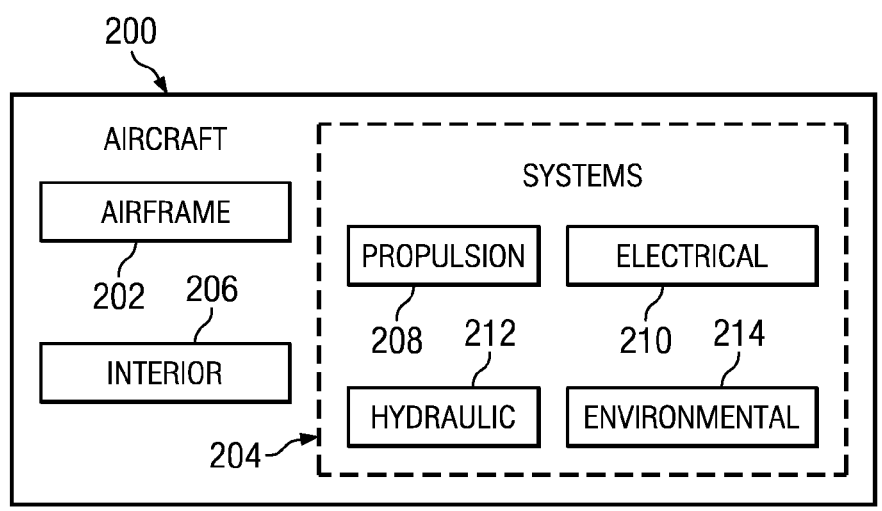
FIG. 2

FLEXIBLE COIL SEGMENTS FOR HIGH EFFICIENCY INDUCTORS

BACKGROUND INFORMATION

1. Field

The present disclosure relates generally to a forming apparatus and method. More particularly, the present disclosure relates to an induction forming apparatus and method for forming components for aircraft and other applications.

2. Background

Induction molding of thermoplastic components, such as thermoplastic composite components, and consolidation of low cost powders, such as titanium powders, may hold significant processing advantages. An induction forming apparatus may have first and second tool dies that are moveable toward and away from each other to mold/consolidate a component therebetween. Each tool die may include a die susceptor that is contoured to form a molded/consolidated component having a desired configuration.

Heating of the die susceptors of the first and second tool dies may be accomplished by extending an induction coil through openings in each of the first and second tool dies. The induction coils are typically formed of copper tubing which is relatively rigid. Current practice, accordingly, is to extend straight lengths of the induction coil through the openings in the tool dies. The straight lengths of the induction coil, however, may not match the contours of the die susceptors, particularly when the die susceptors have a complex contour to mold/consolidate a component having a complex configuration.

If the straight lengths of induction coil extending through a tool die do not match the geometry of the forming surface of the die susceptor mounted to the tool die, significant empty space may be created between the straight lengths of the induction coil and the die susceptor to be heated. This empty space must be filled with magnetic field in order to drive the field to the die susceptor, and filling this space with magnetic field may require significant energy that does not directly contribute to heating the powder/molding compound, thereby creating energy inefficiencies.

Therefore, it would be advantageous to have an induction forming apparatus and method that takes into account one or more of the issues discussed above, as well as possibly other issues.

SUMMARY

In one advantageous embodiment, an apparatus may comprise a tool die for forming a component. The tool die may have a die susceptor having a forming surface for forming the component, and at least one flexible induction coil segment for heating the die susceptor. The at least one flexible induction coil segment may be configured to conform to a contour of the forming surface of the die susceptor.

In another advantageous embodiment, a method may be present for forming a tool die for an induction forming apparatus. A tool die having a die susceptor that includes a forming surface for forming a component may be provided. At least one flexible induction coil segment for heating the die susceptor may also be provided. The at least one flexible induction coil segment may be configured to conform to a contour of the forming surface of the die susceptor.

In still another advantageous embodiment, an apparatus may comprise a first tool die and a second tool die for forming a component. The first tool die and the second tool die may each comprise a die susceptor having a forming surface for forming the component, and at least one flexible induction coil segment for heating the die susceptor. The at least one flexible induction coil segment may be configured to conform to a contour of the forming surface of the die susceptor.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 1 is an illustration of an aircraft manufacturing and service method in accordance with an advantageous embodiment;

FIG. 2 is an illustration of an aircraft in which an advantageous embodiment may be implemented;

DETAILED DESCRIPTION

Figure 3A:
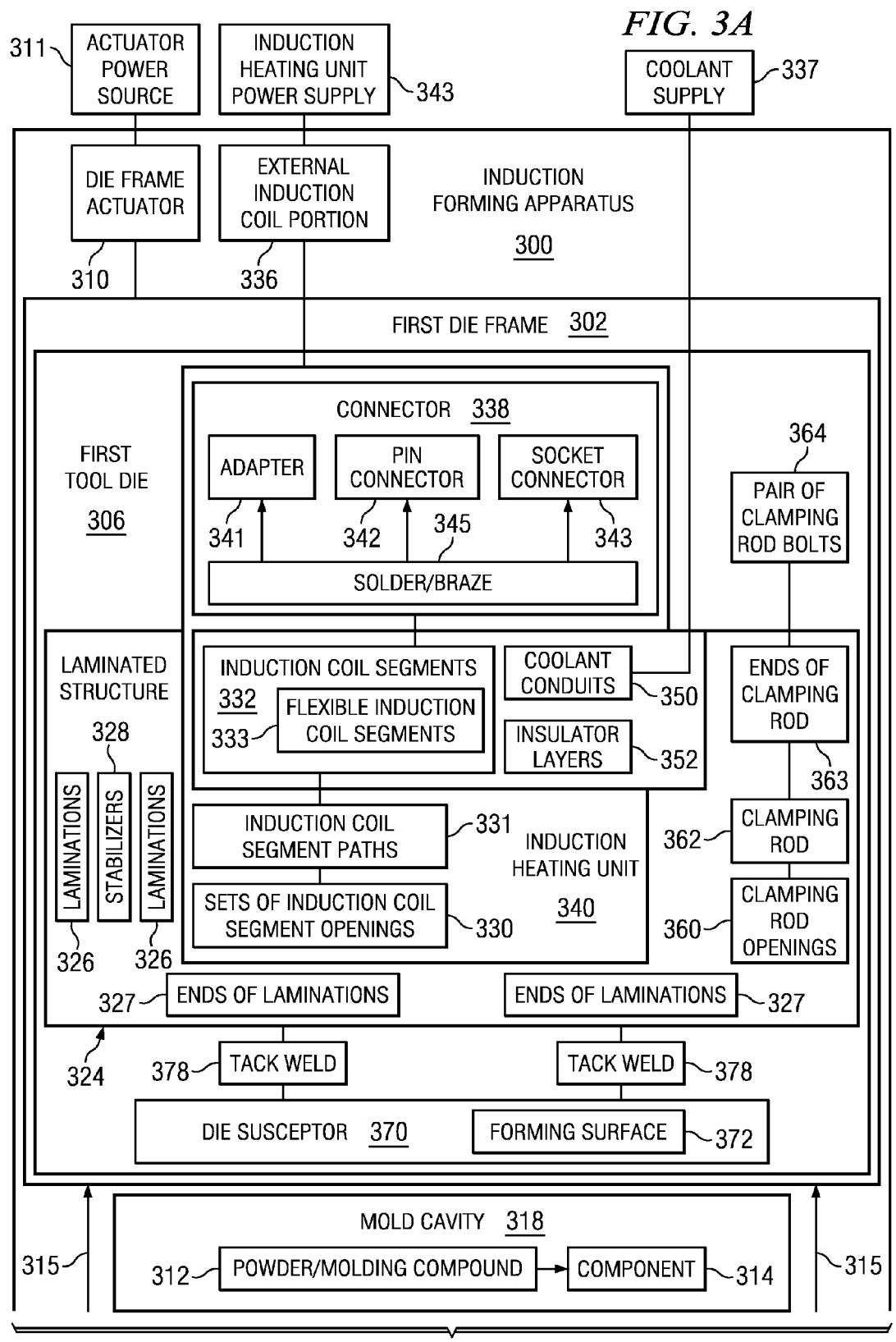
FIGS. 3A and 3B are an illustration of an induction forming apparatus in accordance with an advantageous embodiment.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

As one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1.

Figure 3B:
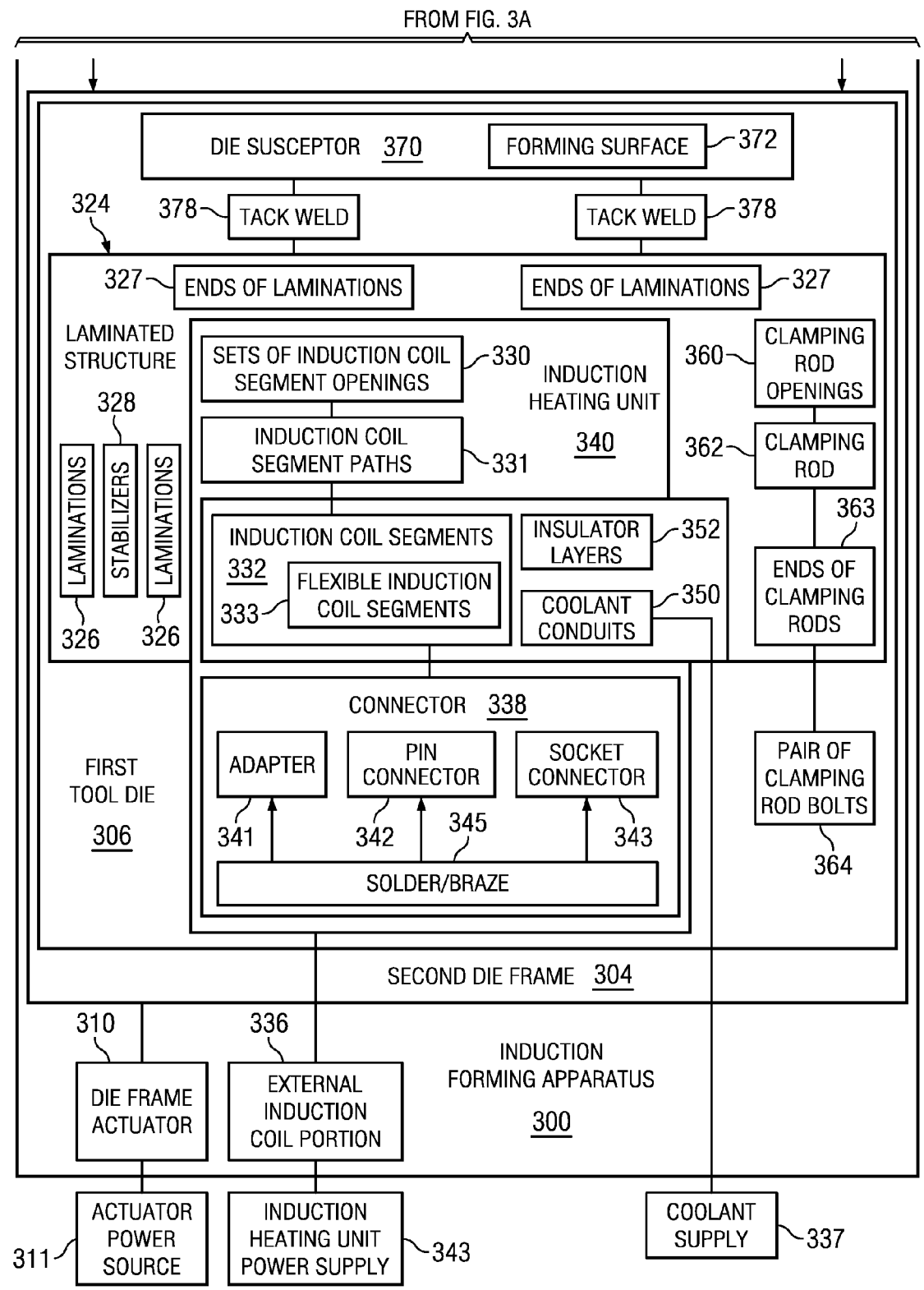

With reference now to FIGS. 3A and 3B, an illustration of an induction forming apparatus is depicted in accordance with an advantageous embodiment. In this advantageous embodiment, the induction forming apparatus is designated by reference number 300, and may be used to mold thermoplastic components, for example and without limitation, thermoplastic composite components, and to consolidate powders, for example and without limitation, titanium powders.

Induction forming apparatus 300 may have a first die frame 302 and a second die frame 304. A first tool die 306 may be mounted on and supported by the first die frame 302, and a second tool die 308 may be mounted on and supported by the second die frame 304. A die frame actuator 310, which may be operated hydraulically or in another manner from an external actuator power source 311, may be provided to move the first tool die 306 and the second tool die 308 toward and away from each other, as indicated by arrows 315, during operation of induction forming apparatus 300 to consolidate/mold a powder/molding compound 312 positioned in a mold cavity 318 defined between the first tool die 306 and the second tool die 308 to form a component 314.

First tool die 306 and second tool die 308 may be substantially identical. Each tool die 306 and 308 may have a laminated structure 324. Laminated structure 324 may include a plurality of spaced metallic laminations 326 which may be separated from one another by a plurality of dielectric stabilizers 328. A plurality of sets of induction coil segment openings 330 may be provided in the plurality of metallic laminations 326 and in the plurality of dielectric stabilizers 328 to form a plurality of induction coil segment paths 331 for receiving a plurality of induction coil segments 332. Induction coil segments 332 may be flexible induction coil segments 333, for example and without limitation, braided induction coil segments.

Induction coil segments 332 may be connected to an external induction coil portion 336 that is external of the first and second tool dies 306 and 308 by at least one connector 338 to form an induction heating unit 340 for heating the first and second tool dies 306 and 308. The induction heating unit 340 of each of the first and second tool dies 306 and 308 may be powered by an external induction heating unit power supply 343.

The at least one connector 338 may include adapters 341, pin connector 342 and socket connector 343. In particular, each induction coil segment 332 of each tool die 306 and 308 may be attached to an adapter 341, for example and without limitation, by soldering or brazing 345, and each adapter 341 may be attached to one of pin or socket connector 342 or 343, respectively. Pin and socket connectors 342 and 343 may engage one another when first and second tool dies 306 and 308 are moved toward each other during forming of a component to electrically connect induction coil segments 332 to external induction coil portion 336, and may disengage from one another when the first and second tool dies 306 and 308 move apart following forming of the component.

The plurality of induction coil segment paths 331 formed by the plurality of sets of induction coil segment openings 330 may also be configured to receive a plurality of coolant conduits 350. For example and without limitation, a coolant conduit 350 may be adjacent to and surround each of the plurality of induction coil segments 332, and at least one insulator layer 352 may surround each induction coil segment 332 and its adjacent coolant conduit 350. The plurality of coolant conduits 350 may be connected to an external coolant supply 337 to receive a coolant, for example and without limitation, water, to cool the first and second tool dies 306 and 308 and the component 314 formed therebetween.

At least one row of clamping rod receiving openings 360 may also be provided in the plurality of metallic laminations 326 and in the plurality of dielectric stabilizers 328 to receive at least one clamping rod 362 to secure the plurality of metallic laminations 326 and the plurality of dielectric stabilizers 328 together. A pair of clamping bolts 364 may be mounted on opposite ends 363 of each at least one clamping rod 362 to releasably secure the plurality of metallic laminations 326 and the plurality of dielectric stabilizers 328 together.

A die susceptor 370 (sometimes also referred to herein as a "smart susceptor") is attached to each of the first and second tool dies 306 and 308. The die susceptor 370 may be attached to the ends 327 of the spaced metallic laminations 326 of laminated structure 324 by, for example, tack welds 378. Each die susceptor 370 may have a forming surface 372 thereon contoured to form a component 314 having a desired configuration.

Induction forming apparatus 300 may be used to consolidate/mold a powder/molding compound 312 to form a component 314. For example and without limitation, induction forming apparatus 300 may be used to mold a thermoplastic material, such as a thermoplastic composite molding compound, to form a thermoplastic composite component; or to consolidate a powder, such as an inexpensive titanium powder, to form a titanium component. Such formed components may be used, for example and without limitation, in aircraft component and subassembly manufacture 106 and in aircraft maintenance and service 114 as illustrated in FIG. 1, and in other applications.

Forming of a component 314 may be accomplished by installing first and second tool dies 306 and 308, each having a die susceptor 370 with a forming surface 372 contoured to form a component 314 having a desired configuration. A powder/molding compound 312 suitable for forming the component 314 may then be placed between the first tool die 306 and the second tool die 308, and die frame actuator 310 may be operated to move the first tool die 306 and the second tool die 308 together to consolidate/mold the component 314. If it is desired to consolidate/mold a different component having a different shape, the tool dies 306 and 308 may be removed from the induction forming apparatus 300 and replaced with another set of tool dies 306 and 308 having die susceptors 370 with forming surfaces 372 of the appropriate contours.

The illustration of the induction forming apparatus 300 in FIG. 3 is not meant to imply physical or architectural limitations to the manner in which different advantageous embodiments may be implemented.

Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Induction coils used in induction forming apparatus are typically formed of copper tubing. The copper tubing may have a round, a rectangular or another cross-sectional shape. For example, a typical induction coil may be formed of copper tubing having a diameter of about one inch and a wall thickness of about 0.062 inch.

Induction coils may be relatively rigid and may not be readily conformed to the contour of a die susceptor. Accordingly, current practice is often to extend straight lengths of the induction coil through aligned openings in the metallic laminations and the dielectric stabilizers of each of the tool dies. The straight lengths of the coil, however, may not match the contours of the forming surfaces on the die susceptors, particularly, when the die susceptors have a complex shape to mold/consolidate components having a complex configuration. If the straight lengths of the induction coil extending through a tool die do not match the geometry of the forming surface of the die susceptor mounted to the tool die, significant empty space may be created between the induction coil and the die susceptor to be heated. This empty space must be filled with magnetic field in order to drive the field to the die susceptor, and filling this space with magnetic field may require significant energy that does not directly contribute to heating the powder/molding compound, thereby creating energy inefficiencies.

According to an advantageous embodiment, an induction forming apparatus is provided that may have first and second tool dies. Each of the first and second tool dies may have a die susceptor that includes a forming surface having a contour to form a component having a desired configuration, and at least one flexible induction coil segment configured to conform to the contour of the forming surface of the die susceptor. According to an advantageous embodiment, the at least one flexible induction coil portion may accurately conform to the contour of the forming surface of the die susceptor to minimize the space between the at least one induction coil segment and the die susceptor. As a result, heating of the die susceptor can be accomplished more efficiently with less power consumption.

According to a further advantageous embodiment, a coolant conduit may be provided adjacent to and may surround each of the at least one flexible induction coil segments of each of the first and second tool dies to supply a coolant to cool the die susceptors and the component formed therebetween. An insulating layer may surround each at least one flexible induction coil segment and its associated coolant conduit, and each coolant conduit may be connected to an external coolant supply to receive a coolant, for example and without limitation, water or another fluid.

Figure 4:
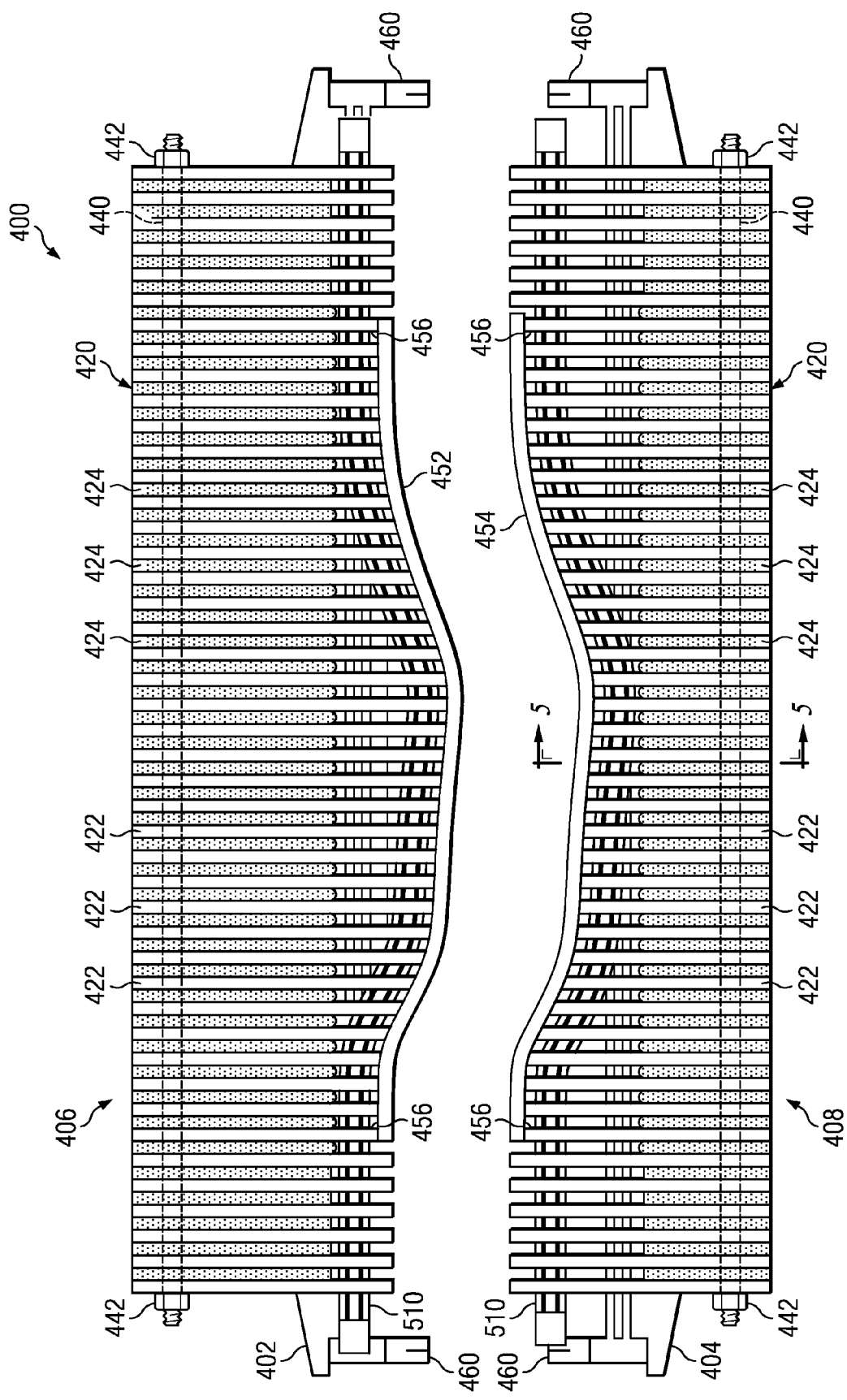
FIG. 4 is an illustration of a front plan view of an induction forming apparatus in accordance with an advantageous embodiment.

With reference now to FIG. 4, an illustration of a front plan view of an induction forming apparatus is depicted in accordance with an advantageous embodiment. The induction forming apparatus is generally designated by reference number 400, and may include a first die frame 402 supporting a first tool die 406, and a second die frame 404 supporting a second tool die 408. FIG. 4 illustrates first tool die 406 and second tool die 408 of induction forming apparatus 400 separated from one another.

First tool die 406 and second tool die 408 may be substantially identical, and each may have a laminated structure generally designated by reference number 420. Laminated structure 420 may include a plurality of spaced metallic laminations 422 separated from one another by a plurality of dielectric stabilizers 424. Metallic lamination 422 may comprise sheets of stainless steel or another suitable material, and may be of sufficiently small thickness, for example and without limitation, about one-sixteenth inch to about one-half inch thick, to resist coupling to an induction coil that may be extended through openings in the metallic laminations 422 and in the dielectric stabilizers 424 as will be explained hereinafter. According to an advantageous embodiment, for example and without limitation, the metallic laminations 422 may be constructed from austenitic stainless steel and have a thickness of about 0.180 inch, and the frequency of the associated induction coil may be 2 KHz. The dielectric stabilizers 424 may, for example and without limitation, be from about one-sixteenth inch to about one-half inch thick to occupy the spaces between the metallic laminations 422.

First tool die 406 and second tool die 408 may each have a clamping rod 440 that may be extended through aligned openings in the metallic laminations 422 and the dielectric stabilizers 424 of the laminated structure 420. The clamping rod 440 may be perpendicular to the metallic laminations 422 and the dielectric stabilizers 424, and a pair of bolts 442 may be mounted on opposite ends of the clamping rod 440. The clamping rods 440 may be used to secure the metallic laminations 422 and the dielectric stabilizers 424 of the laminated structure 420 of the tool dies 406 and 408 together. Although FIG. 4 illustrates one clamping rod 440 for each tool die 406 and 408, it should be understood that each tool die 406 and 408 may have more than one clamping rod 440, if desired.

First tool die 406 may have a die susceptor 452 attached thereto, and second tool die 408 may have a die susceptor 454 attached thereto. Die susceptors 452 and 454 may, for example and without limitation, be formed of molybdenum, which has good high temperature strength and high thermal conductivity, although it should be understood that a tungsten alloy as well as other materials may also be used. Die susceptors 452 and 454 may be attached to the ends of the metallic laminations 422 by, for example, tack welds, schematically illustrated at 456.

The first and second tool dies 406 and 408 and the die susceptors 452 and 454 attached thereto may be contoured to form a component having a desired configuration. In the advantageous embodiment illustrated in FIG. 4, the die susceptors 452 and 454 have substantially the same contour. This is intended to be exemplary only, as die susceptors 452 and 454 may have the same or different shapes and be straight or of any appropriate shape. Metallic laminations 422 of each of the first and second tool dies 406 and 408 may be formed to define the configuration of a component to be formed therebetween. In particular, as shown in FIG. 4, the metallic laminations 422 of first and second tool dies 406 and 408 are configured to correspond to and define the contours of the die susceptors 452 and 454 thereon.

Figure 5:
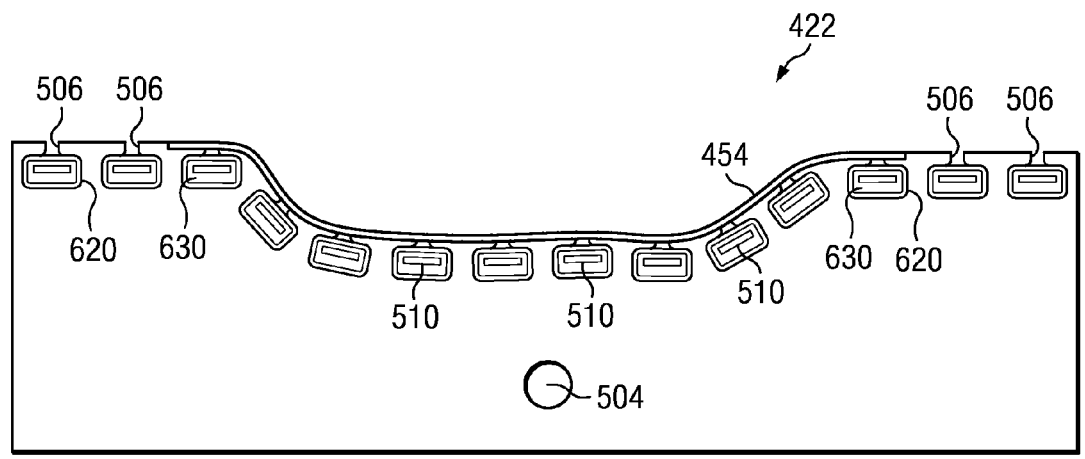
FIG. 5 is an illustration of a cross-sectional view of a tool die of the induction forming apparatus of FIG. 5 taken along line 5-5 in FIG. 4.

With reference now to FIG. 5, an illustration of a cross-sectional view of a tool die of the induction forming apparatus of FIG. 4 is depicted. In particular, FIG. 5 illustrates a cross-sectional view of second tool die 408 taken along line 5-5 in FIG. 4 to show a side view of a metallic lamination 422 of laminated structure 420 of second tool die 408. The metallic laminations 422 of first tool die 406 may be generally similar to those in second tool die 408, albeit turned upside down relative to the metallic laminations 422 in second tool die 408, and thus are not illustrated herein.

As shown in FIG. 5, metallic lamination 422 may be of generally rectangular shape and may have an opening 504 for receiving clamping rod 440 (not shown in FIG. 5). As shown in FIG. 4, the openings 504 in each metallic lamination 422, as well as corresponding holes in the dielectric stabilizers 424 therebetween (not shown in FIG. 5) are lined up so that the clamping rod 440 may be easily installed in the laminated structure 420. Although only one opening 504 for receiving one clamping rod 440 is illustrated in FIG. 5, there may be more than one opening for receiving more than one clamping rod, if desired.

Metallic lamination 422 may also have a plurality of openings 506 for receiving a plurality of induction coil segments 510 of an induction coil unit (not illustrated in FIG. 5). The plurality of openings 506 may be positioned closely adjacent to die susceptor 454 and may be configured to closely follow the contour of the die susceptor 454. In particular, the plurality of openings 506 may be positioned to be as close to the die susceptor 454 as reasonably possible so as to minimize any open space between the induction coil segments 510 and the die susceptor 454.

As shown in FIG. 5, the openings 506 in each metallic lamination 422 and each dielectric stabilizer 424 of laminated structure 420 are also positioned so as to define a path that tracks the contour of the die susceptor 452 or 454 illustrated in FIG. 4. As a result, the openings 506 in adjacent metallic laminations 422 may not be in alignment with one another but may be slightly displaced to define a path that closely follows the contours of the die susceptors 452 and 454. As also shown in FIG. 5, and as will be described more fully hereinafter, each induction coil segment 510 may be surrounded by an annular coolant conduit 630 for supplying coolant to cool the tool die and a component being formed between first and second tool dies 406 and 408. An insulator layer 620 may surround each induction coil segment 510 and define the annular coolant conduit 630 between the induction coil segment 510 and the insulator layer 620.

Figure 6A:
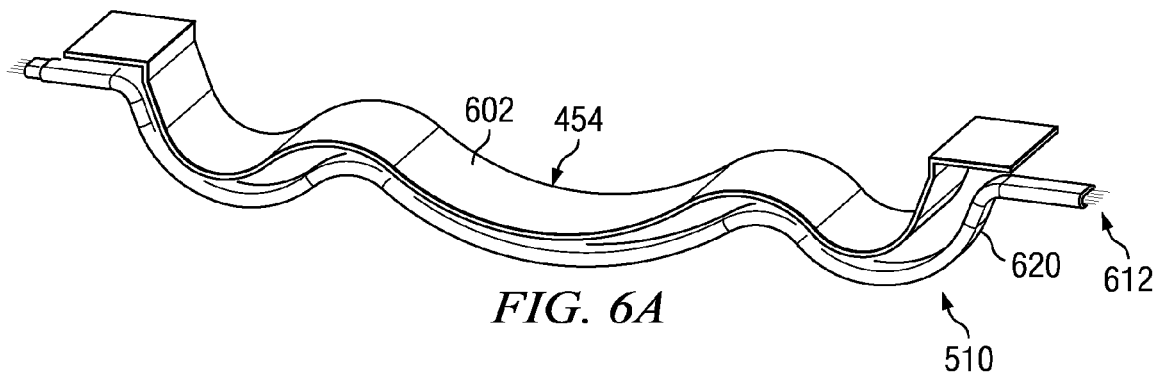
FIG. 6A is an illustration that depicts a side perspective view of the die susceptor and induction coil segment of the induction forming apparatus of FIG. 4.
Figure 6B:
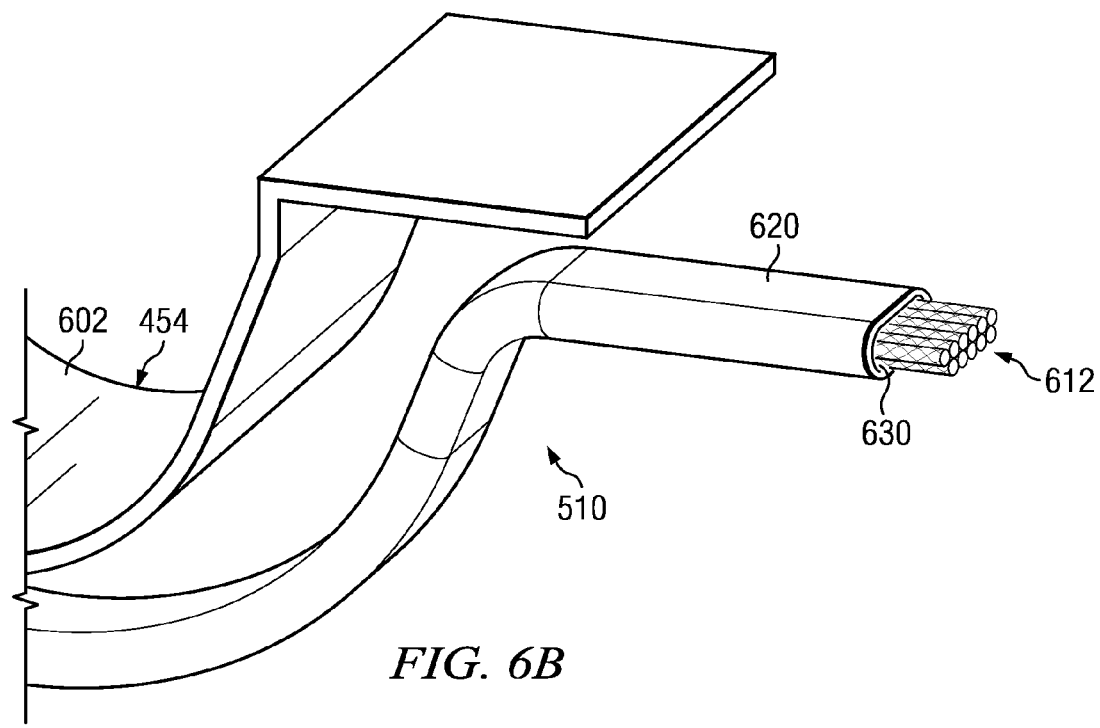
FIG. 6B is an illustration that depicts an enlarged side perspective view of a portion of the die susceptor and induction coil segment of FIG. 6A.

With reference now to FIGS. 6A and 6B, FIG. 6A is an illustration that depicts a side perspective view of the die susceptor and induction coil segment of the induction forming apparatus of FIG. 4, and FIG. 6B is an illustration that depicts an enlarged side perspective view of a portion of the die susceptor and induction coil segment of FIG. 6A. As shown, the die susceptor 454 may have a forming surface 602 having a contour for forming a component having a desired configuration. The induction coil segments 510, only one of which is illustrated in FIG. 6A, may have a similar contour as the die susceptor 454 and the forming surface 602 thereon so as to closely follow the contour of the die susceptor 454 and the forming surface 602 thereon.

In order to enable the induction coil segment 510 to conform to the shape of the die susceptor 454, the induction coil segment 510 may be formed of a flexible material that can be deformed to desired shapes. In accordance with an advantageous embodiment illustrated in FIGS. 6A and 6B, the induction coil segment 510 is formed of a plurality of electrically conductive wires 612, for example and without limitation, a plurality of thin copper wires. In accordance with a further advantageous embodiment, the plurality of wires 612 may be braided.

For example and without limitation, a braid may have between about 100 and about 1000 copper wires, each having a diameter of between about 0.05 inch and about 0.005 inch. The braid configuration provides sufficient flexibility to the induction coil segments 510 to enable the induction coil segments 510 to be extended through the respective set of openings 506 in each of the metallic laminations 422 of laminated structure 420 and through the first and second tool dies 406 and 408, while allowing the induction coil segments 510 to effectively function as solid conductors due to the fact that the wires are touching one another in a multitude of places. Therefore, current can effectively flow through each induction coil segment 510 at a desired thickness of 0.057 inch. This is as a result of the fact that oscillating electric currents tend to flow on the outside of the conductors. With 2 KHz and the conductivity of copper at 1.673 micro-ohms-centimeter, the bulk of the current travels in the outer 0.057 inch of the braided wires. Therefore, the braid provides both flexibility and electrical characteristics of a conductor of the appropriate thickness.

Although induction coil segment 510 illustrated in FIGS. 6A and 6B has a substantially rectangular cross-section, it should be understood that this is intended to be exemplary only as the induction coil segment 510 can also be round or of another desired cross-sectional shape.

Induction coil segment 510 may be sufficiently flexible to enable the segment to be extended through and conform to the path defined by the set of openings 506 in the plurality of metallic laminations 422 in a tool die 406 or 408. As a result, the induction coil segments 510 can be positioned very close to the die susceptors 452 or 454 throughout its length so as to more efficiently heat the die susceptor and a molding compound/powder between the first and second tool dies 406 and 408.

As also shown in FIGS. 6A and 6B, induction coil segment 510 may be covered by an insulator layer 620, for example and without limitation, a flexible high temperature silicon rubber layer. In addition, insulator layer 620 may form an annular coolant conduit 630 around induction coil segment 510 to receive a coolant for cooling the induction coil segment 510, the die susceptor 454 and a component formed between first and second tool dies 406 and 408 following a forming operation.

Figure 7A:
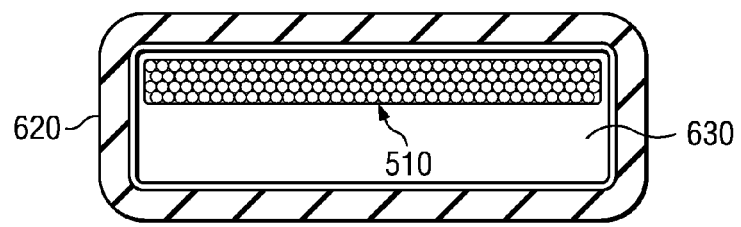
FIG. 7A is an illustration that depicts a cross-sectional view of the induction coil segment of FIGS. 6A and 6B.

In particular, FIG. 7A is an illustration that depicts a cross-sectional view of the induction coil segment of FIGS. 6A and 6B. As shown, insulator layer 620 may surround induction coil segment 510 and define an annular coolant conduit 630 that surrounds induction coil segment 510. Coolant conduit 630 may be connected to an external coolant supply, not shown in FIG. 7A. By providing coolant directly around the induction coil segment 510 and close to the die susceptor 454, a more rapid cooling can be achieved.

Figure 7B:
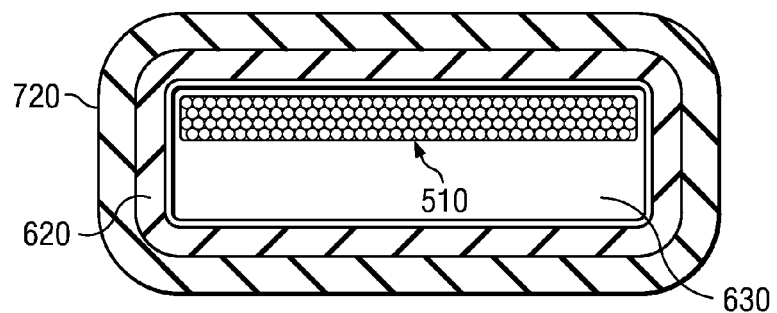
FIG. 7B is an illustration that depicts a cross-sectional view of an induction coil segment in accordance with an advantageous embodiment.

For molding thermoplastic components, the die susceptors 454 and 456 of first and second tool dies 406 and 408 may be at a molding temperature of about 700° F. For such an application, a single insulator layer 620 of flexible high temperature silicon rubber may be used. For consolidating a powder, for example, a titanium powder, higher temperatures, above 700° F. may be required. Accordingly, it may be desirable to provide an additional insulator layer around insulator layer 620. FIG. 7B is an illustration that depicts a cross-sectional view of an induction coil segment in accordance with an advantageous embodiment. As shown in FIG. 7B, a second insulator sleeve 720, for example and without limitation, a silica braided sleeve may be placed over the exterior of flexible silicon rubber insulator layer 620.

Returning now to FIG. 4, following extending of each of the plurality of induction coil segments 510 through their associated set of openings 506 in the first and second tool dies 406 and 408, a connector 460 may be attached to the opposite ends of each induction coil segment 510 in each of first and second tool dies 406 and 408. The connector 460 may electrically connect each induction coil segment 510 to an induction coil portion external of the first and second tool dies 406 and 408 (not shown in FIG. 4) to form an induction coil unit. In addition, the connector 460 may also connect each annular coolant conduit 630 to an external coolant source (also not shown in FIG. 4).

Figure 8:
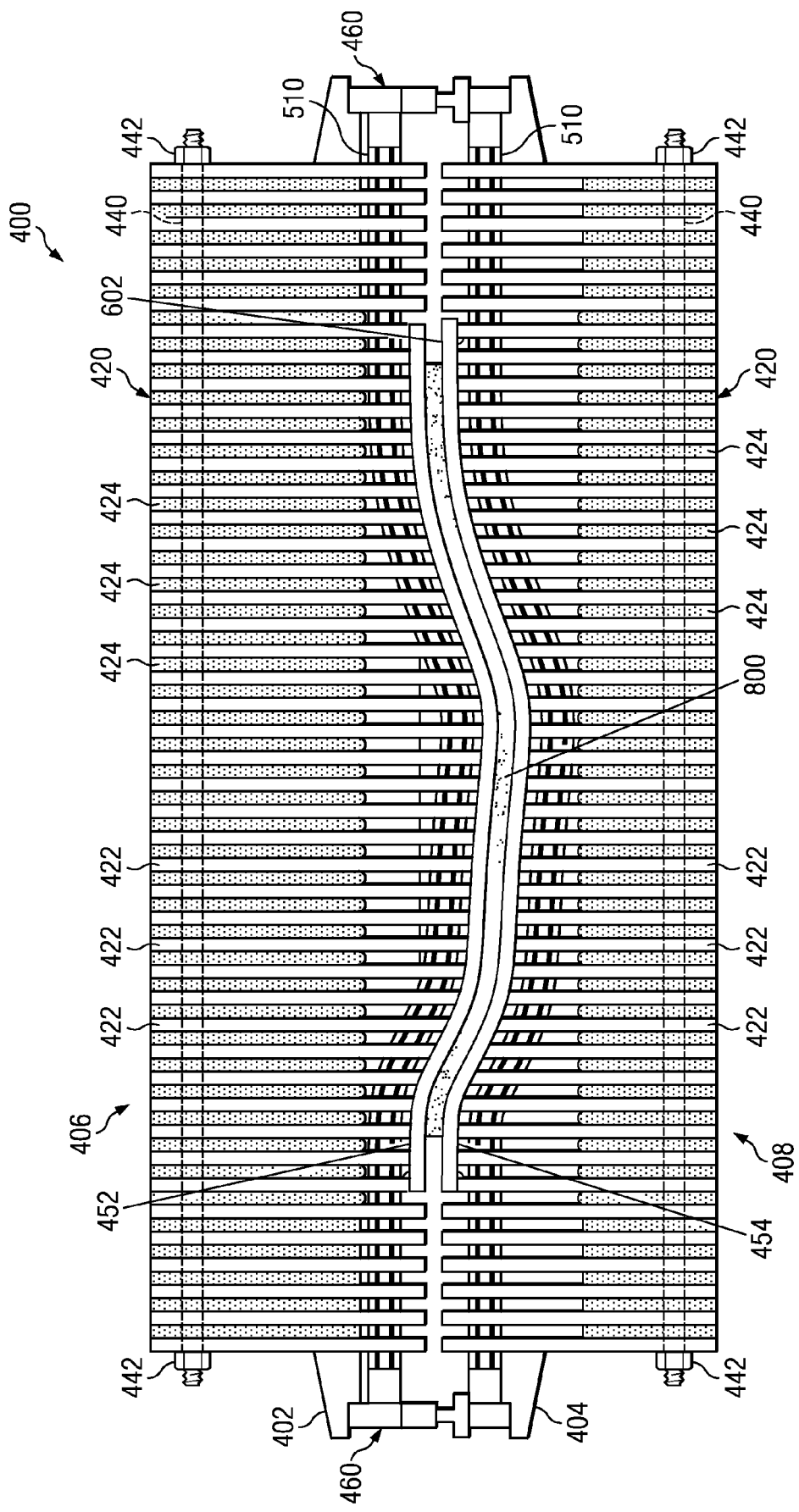
FIG. 8 is an illustration of a front plan view of the induction forming apparatus of FIG. 4 with the tool dies thereof applying pressure to form a component therebetween in accordance with an advantageous embodiment.

With reference now to FIG. 8, an illustration of a front plan view of the induction forming apparatus of FIG. 4 is depicted with the tool dies thereof applying pressure to form a component therebetween in accordance with an advantageous embodiment. In order to form a component, a powder or a thermoplastic molding compound 800 is initially positioned between the first and second tool dies 406 and 408, for example, by being placed in a forming cavity portion in second tool die 408. The first tool die 406 and the second tool die 408 are then moved toward one another.

As the first tool die 406 and the second tool die 408 are moved toward each other, the induction coil segments 510 therein are actuated to heat the first tool die 406 and the second tool die 408, and, in particular, the die susceptors 452 and 454 thereon. Therefore, as the first tool die 406 and the second tool die 408 move toward each other, they rapidly heat the powder/molding compound 800. As the first tool die 406 and the second tool die 408 continue to move toward each other, and, finally, close against the powder/molding compound 800, the powder/molding compound 800 may be consolidated/molded to form a component having a configuration defined by the contours of the forming surfaces 602 of the die susceptors 452 and 454.

At that time, the induction coil unit is inactivated, and coolant system is operated to apply coolant from an external coolant supply (not shown in FIG. 8) to the coolant conduits 630 surrounding the induction coil inserts 510 to cool the tool dies 406 and 408 and the die susceptors 452 and 454 thereon. As a result, the component formed between the tool dies 406 and 408 from powder/molding compound 800 is also rapidly cooled. After a predetermined period of time, when complete cooling of the formed component has occurred, and/or the formed component is able to retain its shape, the coolant system is turned off and the tool dies 406 and 408 are separated from one another. The formed and cooled component may then be removed from the induction forming apparatus 400.

Figure 9:
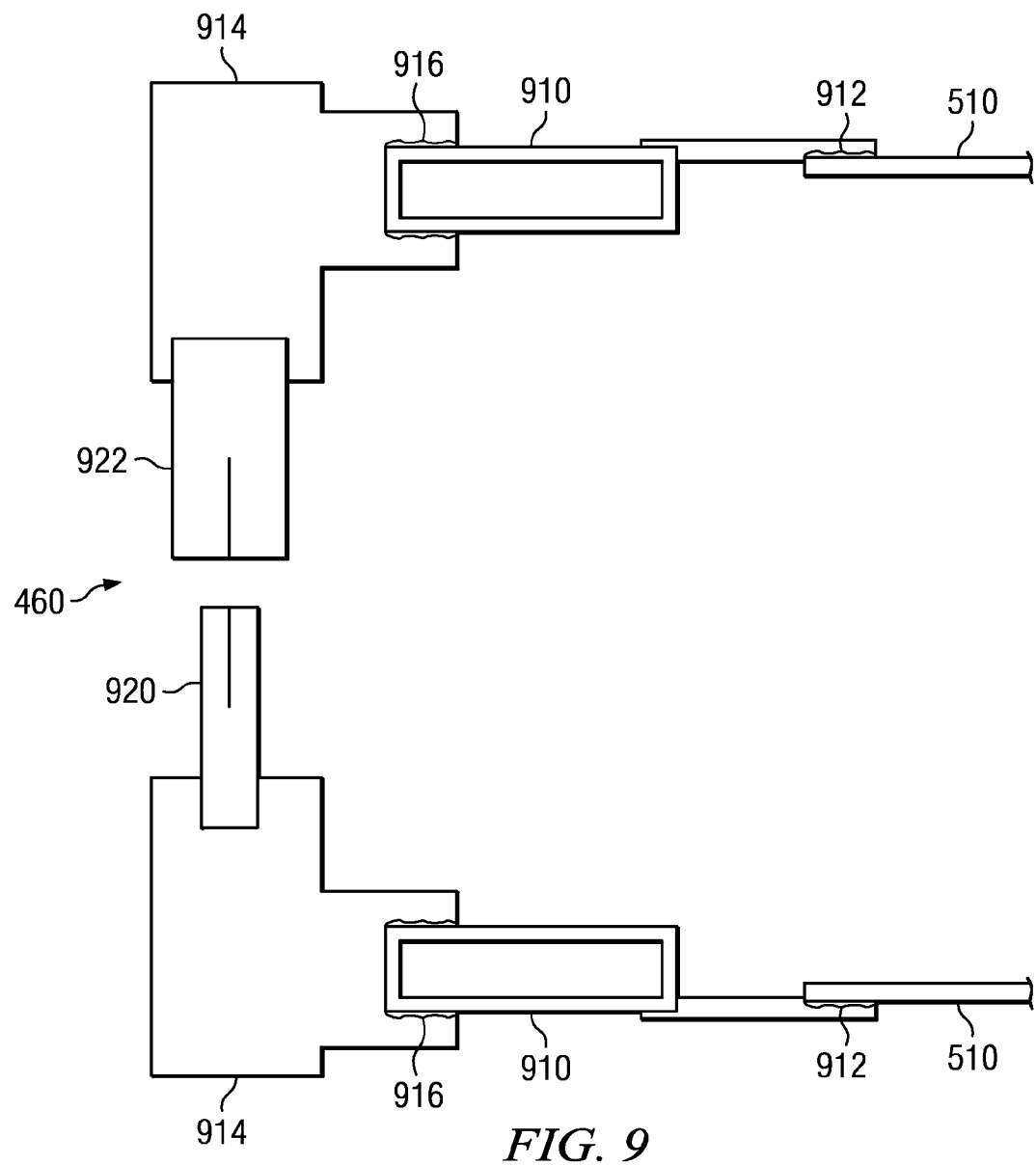
FIG. 9 is an illustration that depicts a connector for electrically connecting induction coil segments of the first and second tool dies of FIG. 4 to an external induction coil portion in accordance with an advantageous embodiment.

Induction coil inserts 510 of each of first and second tool dies 406 and 408 may be activated by being electrically connected to an external induction coil portion (not shown in FIG. 8). In accordance with an advantageous embodiment, induction coil inserts 510 may be electrically connected to the external induction coil portion by connectors 460. FIG. 9 is an illustration that depicts a connector for electrically connecting induction coil segments of the first and second tool dies of FIG. 4 to an external induction coil portion in accordance with an advantageous embodiment. As shown in FIG. 9, each end of each induction coil insert 510 in each tool die may be attached to an adapter 910, for example and without limitation, by soldering or brazing as schematically illustrated at 912. Each adapter 910, in turn, may be attached to a connector fitting 914 of a connector member, for example and without limitation, by soldering or brazing as schematically illustrated at 916.

The connector members may include a pin connector 920 attached to one of first and second tool dies 406 and 408 and a socket connector 922 attached to the other of first and second tool dies 406 and 408. The pin connector 920 and the socket connector 922 may engage one another when the first tool die 406 and the second tool die 408 are moved toward each other to electrically connect the induction coil inserts 510 to the external induction coil, and may disengage one another when the first tool die 406 and the second tool die 408 are moved away from each other following a forming operation.

Figure 10A:
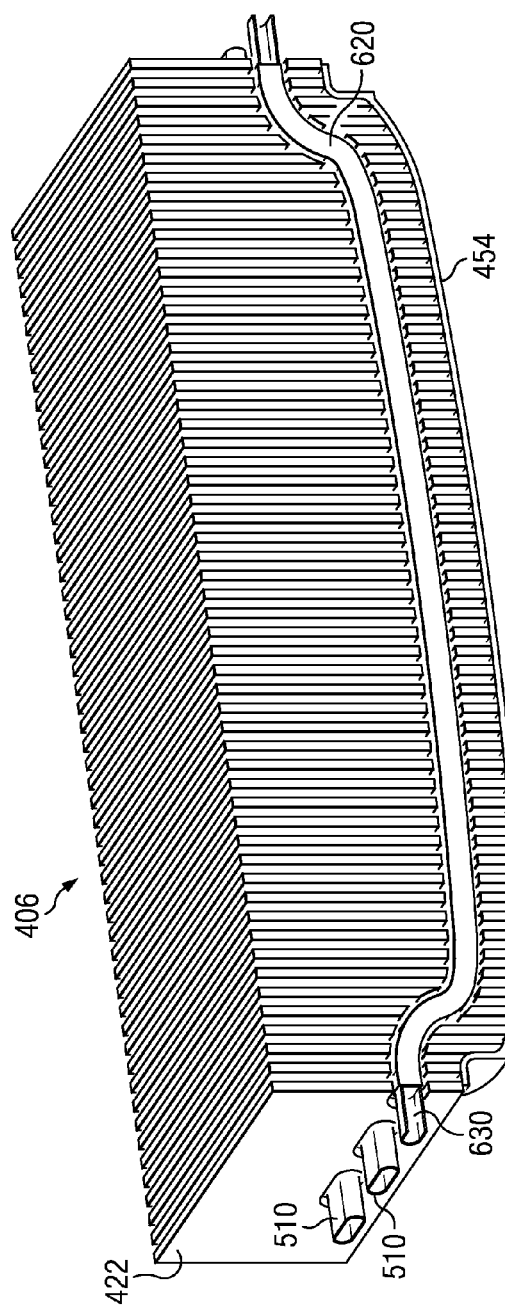
FIG. 10A is an illustration that depicts a perspective, cross-sectional side view of a tool die of the induction forming apparatus of FIG. 4 in accordance with an advantageous embodiment.

With reference now to FIG. 10A, an illustration of a perspective, cross-sectional side view of a tool die of the induction forming apparatus of FIG. 4 is depicted in accordance with an advantageous embodiment. In particular, FIG. 10A illustrates a perspective, cross-sectional side view of tool die 406 illustrated in FIG. 4.

Figure 10B:
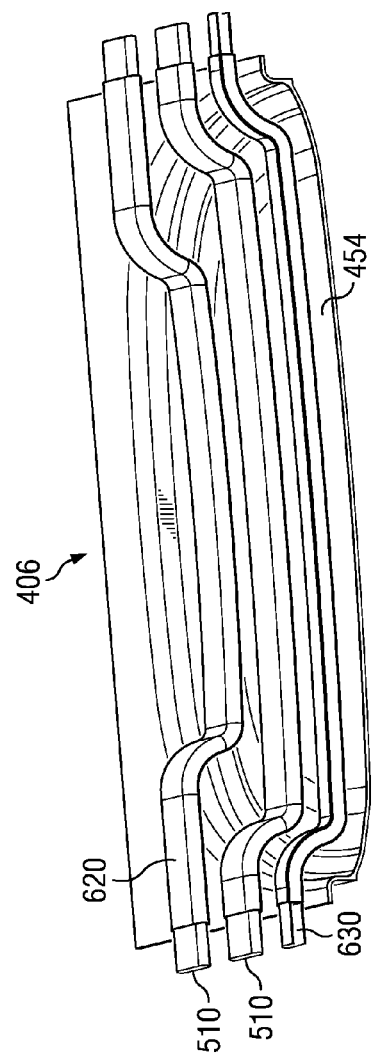
FIG. 10B is an illustration that depicts the induction coil segments and the die susceptor of the tool die illustrated in FIG. 10A.

FIG. 10A illustrates the manner in which the induction coil inserts 510, and the coolant conduits 630 that may surround the induction coil inserts 510, extend through tool die 406 in such a manner as to closely follow the contour of die susceptor 454 thereon. As best shown in FIG. 10B, which is an illustration that depicts the induction coil segments and the die susceptor of the tool die illustrated in FIG. 10A, with metallic laminations 422 not shown for clarity, each induction coil insert 510 and its surrounding coolant conduit 630 may have a slightly different configuration so that each induction coil insert 510 may closely follow the contour of the portion of the die susceptor 454 adjacent to it.

Figure 11:
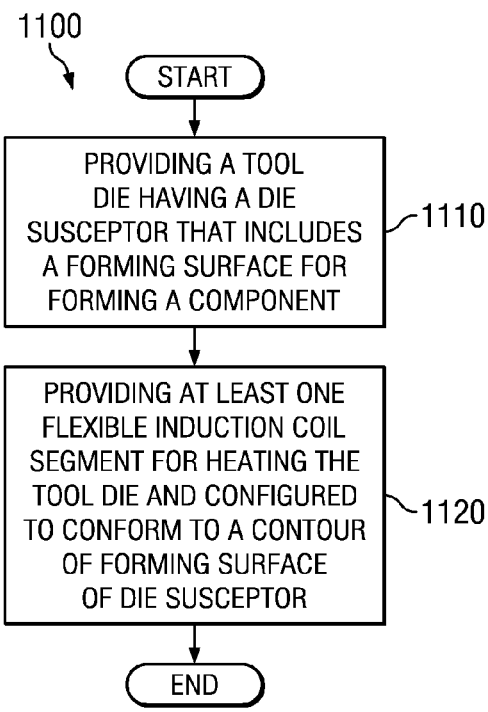
FIG. 11 is an illustration of a flowchart of a process for forming a tool die for an induction forming apparatus in accordance with an advantageous embodiment.

FIG. 11 is an illustration of a flowchart of a process for forming a tool die for an induction forming apparatus in accordance with an advantageous embodiment. The process is generally designated by reference number 1100, and may begin by providing a tool die having a die susceptor that includes a forming surface for forming a component (operation 1110). At least one flexible induction coil segment for heating the tool die may also be provided, the at least one flexible induction coil segment may be configured to conform to a contour of the forming surface of the die susceptor (operation 1120), and the process ends.

Figure 12:
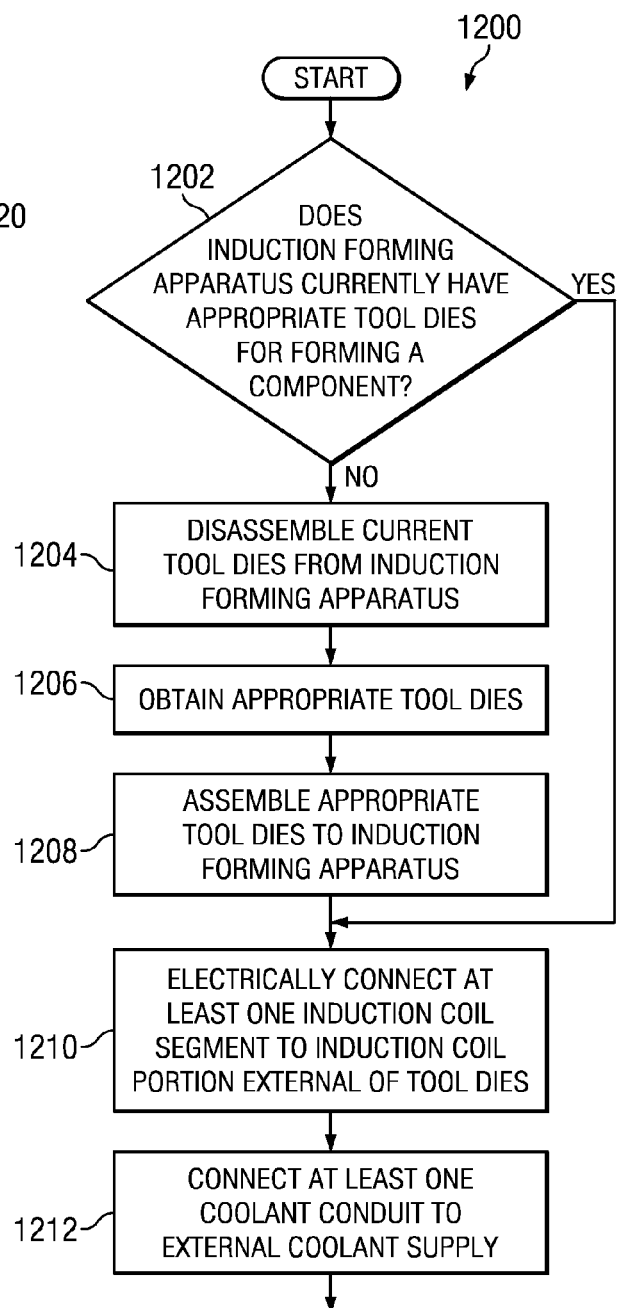
FIG. 12 is an illustration of a flowchart of a process for assembling an induction forming apparatus in accordance with an advantageous embodiment.

FIG. 12 is an illustration of a flowchart of a process for assembling an induction forming apparatus in accordance with an advantageous embodiment. The process illustrated in FIG. 12 may be implemented as part of a process for consolidating/molding a component using the induction forming apparatus 400 depicted, for example, in FIG. 4. The process is generally designated by reference number 1200, and may begin by determining whether an induction forming apparatus currently has appropriate first and second tool dies for forming a component (operation 1202). If it is determined that the induction forming apparatus does currently have the appropriate first and second tool dies (Yes output of operation 1202), the process moves directly to operation 1210 where each at least one induction coil segment in the first and second tool dies are electrically connected to induction coil portions external to the tool dies. If it is determined that the induction forming apparatus does not currently have the appropriate first and second tool dies for forming a component (No output of operation 1202), tool dies that are currently assembled to the induction forming apparatus are disassembled from the induction forming apparatus (operation 1204). Appropriate tool dies for forming a component may then be obtained (operation 1206), for example, from an inventory of tool dies, and the appropriate tool dies are assembled to the induction forming apparatus (operation 1208). The induction coil segments in the appropriate tool dies may then be electrically connected to induction coil portions external of the tool dies (operation 1210), each at least one coolant conduit in the appropriate tool dies may be connected to an external coolant supply (operation 1212), and the process ends.

Figure 13:
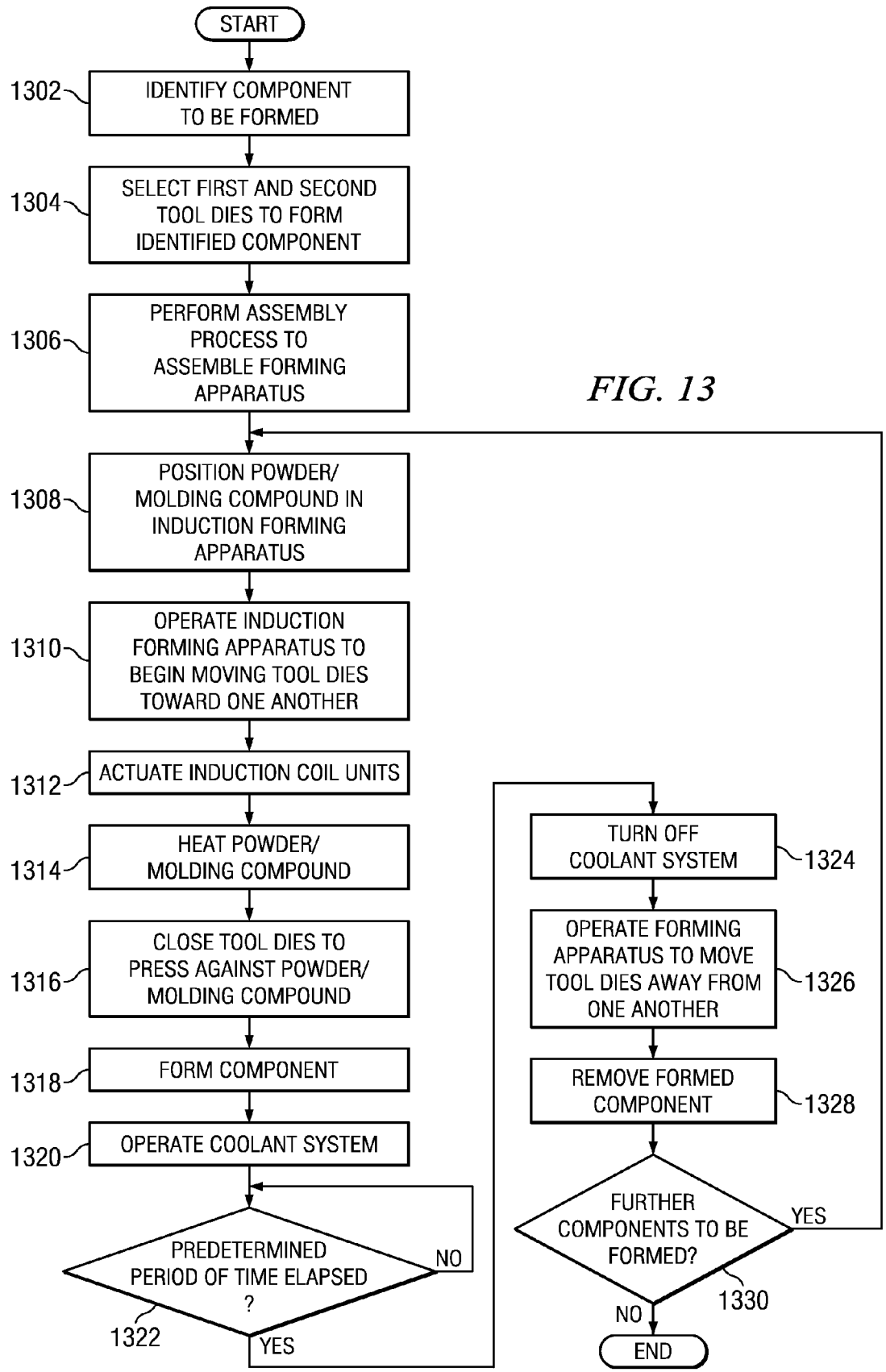
FIG. 13 is an illustration of a flowchart of a process for forming components in accordance with an advantageous embodiment.

With reference now to FIG. 13, an illustration of a flowchart of a process for forming components is depicted in accordance with an advantageous embodiment. The process may, for example, be implemented using induction forming apparatus 400 illustrated in FIG. 4. The process is generally designated by reference number 1300, and may begin by identifying a component to be formed (operation 1302). First and second tool dies having die susceptors configured for forming the component may then be selected (operation 1304). An assembly process may then be performed to assemble an induction forming apparatus to form the component (operation 1306). The assembly process may be implemented as the assembly process 1200 illustrated in FIG. 12.

A powder/molding compound suitable for consolidating/molding the particular component is then positioned in the induction forming apparatus between the first and second tool dies thereof (operation 1308). The induction forming apparatus is then operated to begin moving the first tool die and the second tool die of the induction forming apparatus toward one another (operation 1310). As the first and second tool dies are moved toward one another, induction coil units of the first and second tool dies are actuated to heat the first and second tool dies and die susceptors on the tool dies (operation 1312). The induction coil units may each include at least one induction coil segment in each of the first and second tool dies that conform to the contours of the die susceptors of the first and second tool dies. Therefore, as the first tool die and the second tool die move toward each other, they rapidly heat the powder/molding compound (operation 1314). As the first tool die and the second tool die continue to move toward each other, they finally close and press against the powder/molding compound (operation 1316), causing the powder/molding compound to be consolidated/molded to the configuration of the particular component (operation 1318).

At that time, a coolant system may be operated to supply coolant to the first tool die and the second tool die to rapidly cool the die susceptors and the consolidated/molded component therebetween (operation 1320). The coolant system may include at least one coolant conduit in each of the first and second tool dies that surround the at least one induction coil segment in each of the first and second tool dies. As a result, the consolidated/molded component sandwiched between the die susceptors is also rapidly cooled.

It is then determined if a predetermined period of time has elapsed (operation 1322). The predetermined period of time may be selected to ensure complete cooling of the formed component to ensure that the component is able to retain its shape. If the predetermined time period has elapsed (Yes output of operation 1322), the coolant system is turned off (operation 1324), and the forming apparatus is operated to move the first and second tool dies away from one another (operation 1326). The formed and cooled component is then removed from the forming apparatus (operation 1328). If the predetermined period of time has not elapsed (No output of operation 1322), the process returns to operation 1322.

A determination is then made whether a further component is to be formed (operation 1330). If a further component is to be formed (Yes output of operation 1330), the process returns to operation 1308. If a further component is not to be formed (No output of operation 1330), the process ends.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus, comprising:
    a tool die for forming a component, the tool die comprising:
        a die susceptor having a forming surface for forming the component; and
        at least one flexible induction coil segment for heating the die susceptor, the at least one flexible induction coil segment configured to conform to a contour of the forming surface of the die susceptor.

2. The apparatus of claim 1, wherein the at least one flexible induction coil segment comprises a plurality of electrically conductive wires.

3. The apparatus of claim 2, wherein the plurality of electrically conductive wires are braided.

4. The apparatus of claim 1, wherein the at least one flexible induction coil segment comprises a plurality of flexible induction coil segments.

5. The apparatus of claim 1, and further comprising:
    an induction coil portion external of the tool die; and
    a connector for electrically connecting the at least one flexible induction coil segment to the induction coil portion.

6. The apparatus of claim 1, wherein the tool die further comprises at least one coolant conduit for receiving a coolant for cooling the die susceptor.

7. The apparatus of claim 6, wherein the at least one coolant conduit comprises at least one annular coolant conduit surrounding the at least one flexible induction coil segment.

8. The apparatus of claim 7, and further comprising at least one insulator layer surrounding each at least one annular coolant conduit.

9. The apparatus of claim 5, wherein the connector comprises connector members at opposite ends of the at least one flexible induction coil segment for electrically connecting the opposite ends of the at least one flexible induction coil segment to the induction coil portion.

10. The apparatus of claim 1, wherein the tool die comprises a plurality of metallic laminations, the plurality of metallic laminations each having at least one opening for receiving the at least one flexible induction coil segment, the at least one opening of each of the plurality of laminations configured to conform to the contour of the forming surface of the die susceptor.

11. A method for forming a tool die for an induction forming apparatus, comprising:
providing a tool die having a die susceptor that includes a forming surface for forming a component; and
providing at least one flexible induction coil segment for heating the die susceptor, the at least one flexible induction coil segment configured to conform to a contour of the forming surface of the die susceptor.

12. The method for forming a tool die according to claim 11, wherein providing at least one flexible induction coil segment for heating the die susceptor, comprises:
extending the at least one flexible induction coil segment in the tool die in a path configured to conform to the contour of the forming surface of the die susceptor.

13. The method for forming a tool die according to claim 11, and further comprising:
electrically connecting each at least one flexible induction coil segment to an induction coil portion external of the tool die.

14. The method for forming a tool die according to claim 13, wherein electrically connecting each at least one flexible induction coil segment to an induction coil portion external of the tool die, comprises:
attaching each at least one flexible induction coil segment to an adapter attached to a connector fitting of a connector member.

15. The method for forming a tool die according to claim 11, further comprising:
extending at least one coolant conduit through the tool die for receiving a coolant for cooling the die susceptor.

16. The method for forming a tool die according to claim 15, wherein extending at least one coolant conduit through the tool die for receiving a coolant for cooling the die susceptor, comprises:
surrounding each at least one flexible induction coil segment by a coolant conduit.

17. The method for forming a tool die according to claim 16, further comprising:
surrounding each at least one coolant conduit by an insulator layer.

18. The method for forming a tool die according to claim 11, further comprising;
providing at least one induction coil segment path for receiving each at least one flexible induction coil segment, each at least one induction coil segment path having a contour configured to conform to a contour of the forming surface of the die susceptor.

19. An apparatus, comprising:
a first tool die and a second tool die for forming a component, the first tool die and the second tool die each comprising:
a die susceptor having a forming surface for forming the component; and
at least one flexible induction coil segment for heating the die susceptor, the at least one flexible induction coil segment configured to conform to a contour of the forming surface of the die susceptor.

20. The apparatus of claim 19, wherein each at least one flexible induction coil segment comprises a braided induction coil segment.

21. The apparatus of claim 19, and further comprising:
an induction coil portion external of the first tool die and the second tool die; and
at least one connector for electrically connecting the at least one flexible induction coil segment of each of the first tool die and the second tool die to the induction coil portion for heating the die susceptor of the first tool die and the die susceptor of the second tool die.

22. The apparatus of claim 19, further comprising:
at least one coolant conduit extending through each of the first tool die and the second tool die, each at least one coolant conduit being adjacent a flexible induction coil segment of the at least one flexible induction coil segment.

23. The apparatus of claim 22, wherein each at least one coolant conduit surrounds the adjacent flexible induction coil segment.

24. The apparatus of claim 23, further comprising at least one insulator layer surrounding each at least one coolant conduit.

25. The apparatus of claim 24, wherein the component comprises a molded thermoplastic component, and the at least one insulator layer comprises a flexible high temperature silicon rubber layer.

26. The apparatus of claim 24, wherein the component comprises a compressed powder component, and the at least one insulator layer comprises a flexible high temperature silicon rubber layer, and a silica braided sleeve surrounding the flexible high temperature silicon rubber layer.

* * * * *